Dec. 15, 1936.        J. D. MacCARTHY              2,064,551
PROCESS FOR EXTRACTING VALUES FROM MANGANESE CARBONATE ORES
Original Filed Jan. 26, 1931
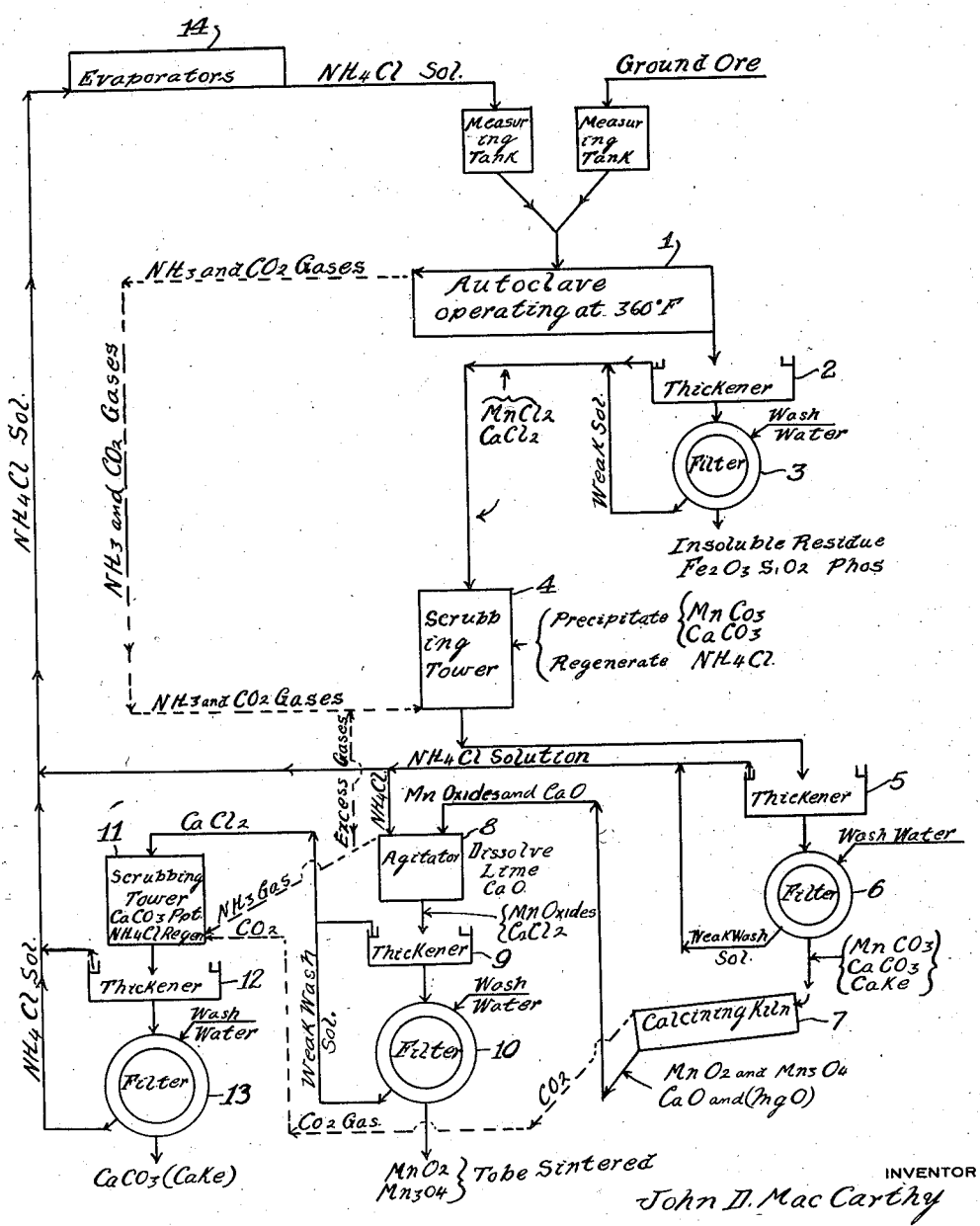
INVENTOR
John D. MacCarthy
BY Whittemore Hulbert
Whittemore & Belknap
ATTORNEYS

UNITED STATES PATENT OFFICE 2,064,551

PROCESS FOR EXTRACTING VALUES FROM MANGANESE CARBONATE ORES

John D. MacCarthy, Chamberlain, S. Dak., assignor to General Manganese Corporation, Detroit, Mich., a corporation of Delaware Application January 26, 1931, Serial No. 511,376
Renewed June 6, 1935

14 Claims. (Cl. 23—145)

The invention relates to the extraction of metals from ores and has for its object the obtaining of a process applicable to the economical treatment of relatively low grade ores containing various metals in the form of oxides, carbonates or other insoluble compounds. The invention consists in the novel method of converting these insoluble compounds into soluble compounds, thereby permitting of separation from the gangue by leaching. The invention further consists in various features of the process as hereinafter set forth.

While my improved process is applicable to the treatment of various ores containing different metals and in different chemical compounds, I will specifically describe its application to the treatment of a manganese carbonate ore such as one of the following analysis:

| | | Percent |
|---|---|---|
| Dried 212° | Mn | 16.00 |
| | Fe | 11.00 |
| | P | .429 |
| | $SiO_2$ | 13.00 |
| | MgO | 1.80 |
| | CaO | 15.00 |
| | $Al_2O_3$ | 2.70 |
| | $CO_2$ loss | 26.00 |

The extraction of the metals from ores of this character involves essentially two steps, first, the digestion of the ores to render the insoluble metallic compounds soluble so that they may be separated from the gangue; second, the differential precipitation of the metals. To render the whole process cyclic, the reagent which is employed in the digestion step is recovered in the precipitation step so as to be capable of use upon further ore.

Heretofore processes of the general type just described have been used in which the first or digestion step has been accomplished by a leaching agent. Also this digestion step has been accomplished by roasting the ore with a reagent which renders the desired metal content soluble. The latter process is very effective in separating out the metals but inasmuch as a fairly high temperature is required in roasting, the cost is greater than with the leaching process. On the other hand, with the leaching process the separation is not as effective. It is one of the objects of the present invention to obtain a process which is less costly to operate than the roasting process and which has greater efficiency than the leaching process. This is accomplished by treating the ores in an autoclave with a liquid reagent under elevated pressure and temperature. As a result of this treatment the desired metal compounds are soluble and can be readily separated from the gangue.

While my invention is applicable to various ores and may be carried out with various reagents, I will give below an example of the detailed application of the process to the ore cited above for example and using the particular reagent ammonium chloride. The desired metals wanted in this ore are compounds of manganese, magnesium and calcium, in which instance the following procedure would be preferable, as shown in the flowsheet of the accompanying drawing.

In the first step the ammonium chloride reagent and the above manganese carbonate ore in proportionate quantities are placed in a closed container or autoclave 1; the temperature is raised in this instance to preferably 360° F. with a corresponding increase in pressure. While the above temperature is preferable in this particular instance, it is within the scope of my invention to maintain the temperatures within the range from substantially above 212° F. to substantially below the decomposition temperature of the ammonia gas.

The above temperature and pressure are maintained for a period of time dependent upon the temperature, the quality of the materials involved and the quantity of materials used, to form soluble chlorides of manganese, magnesium and calcium resulting in the evolution of ammonia and carbon dioxide gases which are withdrawn continuously or intermittently as desired in order to maintain the said conditions.

The gases leaving the autoclave 1 are passed directly to the scrubbing tower 4 and used as will be described later. The solution and solid materials leaving the autoclave 1 are passed to the thickener 2 and the filter 3 where the soluble chlorides are separated from the insoluble residue. The soluble chlorides which in this case are manganese, magnesium and calcium pass from thickener 2 into the scrubbing tower 4 and are used to absorb the ammonia and carbon dioxide gases, to precipitate and recover the desired metals as the insoluble carbonates of manganese, magnesium and calcium and to reform the reagent, ammonium chloride. After separation at thickener 5 and filter 6 the ammonium chloride is evaporated at evaporators 14 and returned in order to repeat the cycle.

Thus in the above instance the desired metals have been extracted and recovered from this ore and the reagent used has been reformed to make the process cyclic.

The second or differential precipitation step of the process effects a separate recovery of one or more of the desired metal compounds, this step having been previously disclosed in the co-pending patent application of Sweet and MacCarthy bearing Serial No. 394,680, filed September 23, 1929. Preferably the second step is carried out as follows:

The mixed carbonates of manganese, magnesium and calcium now a metallurgical product or artificial ore recovered in the first step are calcined in the kiln 7 to form the oxides of the metals; the carbon dioxide gas evolved is conducted to the scrubbing tower 11 and used as will be described later. The oxides leaving the kiln 7 consisting of a mixture of manganese, magnesium and calcium are passed to the agitator 8 and treated with a proportionate quantity of hot ammonium chloride solution. The reaction in the agitator 8 forms soluble chlorides of lime and magnesia, resulting in the evolution of ammonia gas which is conducted to the scrubbing tower 11 and used as will be described later. The manganese oxides remain as the insoluble residue and are recovered by means of thickener 9 and filter 10.

The calcium and magnesium chlorides leaving thickener 9 are used in the scrubbing tower 11 to absorb the ammonia and carbon dioxide gases to precipitate and recover the insoluble carbonates of calcium and magnesium and to reform the reagent, ammonium chloride. Following the separation at thickener 12 and filter 13, the ammonium chloride is evaporated at evaporators 14 to the original strength and returned to repeat the cycle.

Thus in the above ore given as an example, the desired metals were first extracted and recovered as the mixed carbonates practically free from the objectionable impurities, consisting in this instance of iron compounds, phosphates, silica, alumina, etc., which are found in the insoluble residue, and the reagent used was reformed and returned to complete the cycle. Lastly the desired metals were subsequently treated and recovered separately practically free from objectionable impurities and the reagent used was again regenerated and returned to complete the cycle.

What I claim as my invention is:

1. The process of extracting a manganese compound from ores containing manganese carbonates and carbonates of one or more other metals comprising treating the ore with a water solution of ammonium chloride in a closed container under pressure higher than atmospheric and temperature substantially higher than 212° F. but substantially below the decomposition temperature of ammonium gas, collecting the liberated ammonia and carbon dioxide gases, removing the material from the container and separating the solution from the gangue and treating the solution directly with the collected ammonia and carbon dioxide gases to precipitate one or more of the metal carbonates.

2. The process of extracting a manganese compound from ores containing manganese carbonates and carbonates of one or more other metals including calcium comprising the treating of the ore with a water solution of ammonium chloride in a closed container under a pressure higher than atmospheric and temperature substantially higher than 212° F. but substantially below the decomposition temperature of ammonia gas to convert the carbonates into soluble chlorides, collecting the liberated ammonia and carbon dioxide gases, removing the material from the container and separating the solution from the gangue, treating the solution with the ammonia and carbon dioxide gases to precipitate calcium carbonate and manganese carbonate with the reformation of ammonium chloride, separating the solution from the precipitate, calcining the manganese and calcium carbonates to form oxides, treating the oxides with the ammonium chloride solution to form calcium chloride and separating the manganese oxide therefrom and treating the calcium chloride with ammonia and carbon dioxide gases to precipitate calcium carbonate and reform ammonium chloride.

3. The process of extracting manganese compounds from ores containing manganese carbonates and carbonates of one or more other metals comprising treating the ore with a water solution of ammonium chloride in a closed container under pressure higher than atmospheric and temperature substantially higher than 212° F. but substantially below the decomposition temperature of ammonia gas, collecting the liberated ammonia and carbon dioxide gases, removing the material from the container and separating the solution from the gangue and treating the solution directly with the collected ammonia and carbon dioxide gases to precipitate one or more of the metal carbonates, and to reform ammonium chloride, and separating and evaporating the same in order to repeat the cycle.

4. The process of extracting metal compounds from ores containing manganese carbonates and compounds of one or more other metals which comprises treating the ore in a closed container with a solution of an ammonium salt capable of forming a soluble manganese compound and resulting in the evolution of ammonia and carbon dioxide gases, heating the same to a temperature substantially higher than 212° F. but substantially below the decomposition temperature of the ammonia gas, with a corresponding increase in pressure thereby evolving ammonia and carbon dioxide gases, removing said gases from said container, separating the soluble manganese compound from the insoluble residue, treating the soluble manganese compound with the said gases to precipitate insoluble manganese carbonate, thereby reforming the said ammonium salt and separating and evaporating the same in order to repeat the cycle.

5. The process of extracting metal compounds from ores containing manganese carbonates and carbonates of one or more other metals including calcium comprising the treating of the ore with a water solution of ammonium chloride in a closed container under a pressure higher than atmospheric and temperature substantially higher than 212° F. but substantially below the decomposition temperature of ammonia gas to convert the carbonates into soluble chlorides, collecting the liberated ammonia and carbon dioxide gases, removing the material from the container and separating the solution from the gangue, treating the solution with the ammonia and carbon dioxide gases to precipitate calcium carbonate and manganese carbonate with the reformation of ammonium chloride, separating the solution from the precipitate, calcining the manganese and calcium carbonates to form oxides, treating the oxides with the ammonium chloride solution to form calcium chloride and separating the manganese oxide therefrom and treating the calcium chloride with ammonia and carbon dioxide gases to precipitate calcium carbonate and reform ammonium chloride, separating and collecting the ammonium chloride from the several precipitations and evaporating the same in order to repeat the cycle.

6. The process of recovering manganese compounds from ores containing manganese carbonate, iron and insoluble compounds which comprises treating the ore in a closed container with a solution of an ammonium salt capable of forming a soluble manganese compound and resulting in the evolution of ammonia and carbon dioxide gases, heating the same to a temperature substantially higher than 212° F. but substantially below the decomposition temperature of the ammonia gas, with a corresponding increase in pressure, thereby evolving ammonia and carbon dioxide gases, removing said gases from said container, separating the soluble manganese compound from the insoluble residue, treating the soluble manganese compound with the said gases to precipitate insoluble manganese carbonate, thereby reforming the said ammonium salt and separating and evaporating the same in order to repeat the cycle.

7. The process of recovering metal compounds from ores containing manganese carbonate and one or more other metal carbonates, iron and insoluble compounds which comprises treating the ore with a solution of ammonium chloride in a closed container, heating the same to a temperature substantially higher than 212° F. but substantially below the decomposition temperature of the ammonia gas, with a corresponding increase of pressure to form soluble chlorides of manganese and one or more other metals, resulting in the evolution of ammonia and carbon dioxide gases, separating the soluble chlorides from the insoluble residue, treating the soluble chlorides with the said gases in order to precipitate insoluble carbonates of manganese and one or more other metals, thereby reforming the ammonium chloride and separating and evaporating the same in order to repeat the cycle.

8. The process of recovering metal compounds from ores containing manganese, magnesium and calcium carbonates, iron and insoluble compounds which comprises treating the ore with a solution of ammonium chloride in a closed container, heating the same to a temperature substantially higher than 212° F. but substantially below the decomposition temperature of the ammonia gas, with a corresponding increase in pressure to form soluble chlorides of manganese, magnesium and calcium, resulting in the evolution of ammonia and carbon dioxide gases, separating the soluble chlorides from the insoluble residue, treating the soluble chlorides with the said gases in order to precipitate an insoluble mixture of manganese, magnesium and calcium carbonates, thereby reforming the said ammonium chloride and separating and evaporating the same in order to repeat the cycle.

9. The process of recovering metal compounds from ores containing manganese and calcium carbonates and insoluble compounds which comprises treating the ore with a solution of ammonium chloride in a closed container, heating the same to a temperature substantially higher than 212° F. but substantially below the decomposition temperature of the ammonia gas, with a corresponding increase in pressure to form soluble chlorides of manganese and calcium, resulting in the evolution of ammonium and carbon dioxide gases, separating the soluble chlorides from the insoluble residue, treating the soluble chlorides with the said ammonia and carbon dioxide gases to precipitate the insoluble carbonates of manganese and calcium, thereby reforming the ammonium chloride, separating and evaporating the same in order to repeat the cycle, calcining the mixed carbonates to form the oxides of the metals, resulting in the evolution of carbon dioxide gas, treating the oxides with a solution of ammonium chloride to form soluble calcium chloride, resulting in the evolution of ammonium gas, separating the soluble calcium chloride from the insoluble manganese oxides, treating the soluble calcium chloride with the said ammonia and carbon dioxide gases to precipitate insoluble calcium carbonate and to reform ammonium chloride and separating and evaporating the same in order to repeat the cycle.

10. The process of extracting metal compounds from ores containing manganese, magnesium and calcium carbonates and insoluble compounds which comprises treating the ore with a solution of ammonium chloride in a closed container, heating the same to approximately 360° F., with a corresponding increase in pressure to form the soluble chlorides of manganese, magnesium and calcium, resulting in the evolution of ammonia and carbon dioxide gases, separating the soluble chlorides from the insoluble residue, treating the soluble chlorides with the said ammonia and carbon dioxide gases to precipitate insoluble carbonates of manganese, magnesium and calcium, thereby reforming the ammonium chloride, separating and evaporating the same in order to repeat the cycle, calcining the mixed carbonates to form oxides of manganese, magnesium and calcium, resulting in the evolution of carbon dioxide gas, treating the oxides with a solution of ammonium chloride to form soluble chloride of magnesium and calcium, resulting in the evolution of ammonia gas, separating the soluble chlorides from the insoluble manganese oxide residue, treating the soluble chlorides of magnesium and calcium with the said ammonia and carbon dioxide gases to precipitate insoluble carbonates of magnesium and calcium, thereby reforming the ammonium chloride and separating and evaporating the same in order to repeat the cycle.

11. The process of extracting metal compounds from ores containing manganese, magnesium and calcium carbonates, iron and insoluble compounds of the class comprising silica, phosphates, alumina, etc., which comprises treating the ore with a solution of ammonium chloride in a closed container, heating the same to approximately 360° F. with a corresponding increase in pressure to form the soluble chlorides of manganese, magnesium and calcium, resulting in the evolution of ammonia and carbon dioxide gases, separating the soluble chlorides from the insoluble residue, treating the soluble chlorides with the said ammonia and carbon dioxide gases to precipitate insoluble carbonates of manganese, magnesium and calcium, thereby reforming the ammonium chloride, separating and evaporating the same in order to repeat the cycle, calcining the mixed carbonates to form oxides of manganese, magnesium and calcium, resulting in the evolution of carbon dioxide gas, treating the oxides with a solution of ammonium chloride to form soluble chlorides of magnesium and calcium, resulting in the evolution of ammonia gas, separating the soluble chlorides from the insoluble manganese oxide residue, treating the soluble chlorides of magnesium and calcium with the said ammonia and carbon dioxide gases to precipitate insoluble carbonates of magnesium and calcium, thereby reforming the ammonium chloride and separating and evaporating the same in order to repeat the cycle.

12. The process of extracting metal compounds from ores containing manganese carbonates and compounds of one or more other metals which comprises treating the ore in a closed container with a solution of an ammonium salt capable of forming a soluble manganese compound and resulting in the evolution of ammonia and carbon dioxide gases, heating the same to a temperature substantially higher than 212° F. but substantially below the decomposition temperature of the ammonia gas, with a corresponding increase in pressure and separating the soluble manganese compound from the insoluble residue.

13. The process of recovering manganese compounds from ores containing manganese carbonate, iron and insoluble compounds which comprises treating the ore in a closed container with a solution of an ammonium salt capable of forming a soluble manganese compound and resulting in the evolution of ammonia and carbon dioxide gases, heating the same to a temperature substantially higher than 212° F. but substantially below the decomposition temperature of the ammonia gas, with a corresponding increase in pressure and separating the soluble manganese compound from the insoluble residue.

14. The process of recovering metal compounds from ores containing manganese carbonate and one or more other metal carbonates, iron and insoluble compounds which comprises treating the ore with a solution of ammonium chloride in a closed container, heating the same to a temperature substantially higher than 212° F. but substantially below the decomposition temperature of the ammonia gas, with a corresponding increase of pressure to form soluble chlorides of manganese and one or more other metals, resulting in the evolution of ammonia and carbon dioxide gases and separating the soluble chlorides from the insoluble residue.

JOHN D. MacCARTHY.